Jan. 4, 1966  W. F. ROBB  3,227,598
CORE STRUCTURE

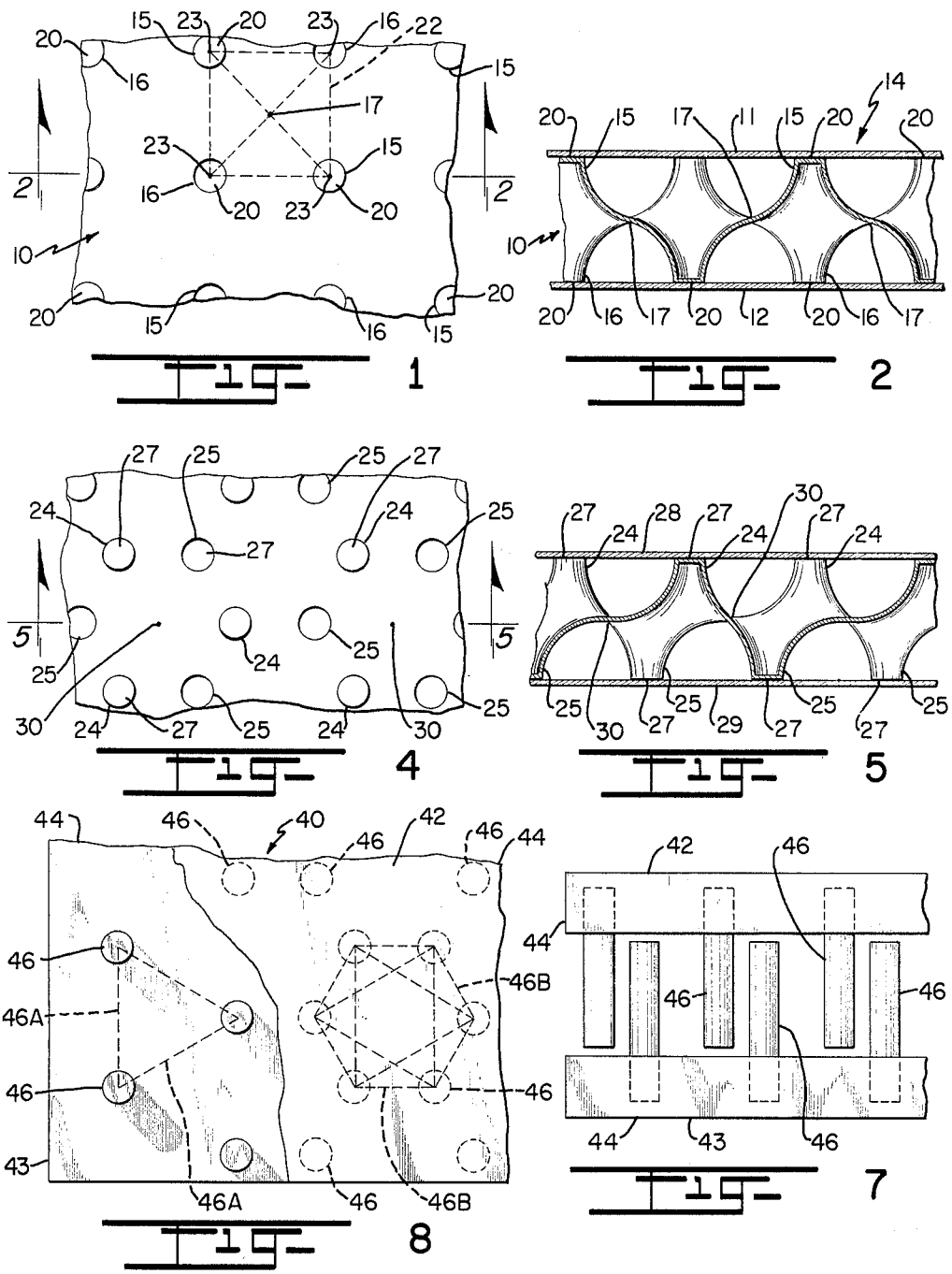

Filed Dec. 2, 1960  2 Sheets-Sheet 2

INVENTOR.
WAYNE F. ROBB
BY
*Philip H. Sheridan*
ATTORNEY

United States Patent Office 3,227,598
Patented Jan. 4, 1966

3,227,598
CORE STRUCTURE
Wayne F. Robb, 1099 Kenton, Aurora, Colo.
Filed Dec. 2, 1960, Ser. No. 73,443
9 Claims. (Cl. 161—68)

This invention relates to a new and useful article of manufacture together with a unique method and apparatus for making the article, and is specifically directed to the novel formation of a core structure characterized by its conformability under minimum stress to various plane and curved surfaces and its high strength under virtually any given direction of force.

Modern construction techniques have created a demand for lightweight panels in interior and exterior walls, floors, decks, roofs and other structural elements. It is customary in the above applications and others to employ so-called "sandwich" panels comprised of two plane surfaces or skins bonded to a cellular core or spacer, such as, panels of the general character employed in cartons and containers and usually formed of corrugated paper core bonded between paper skins. This general arrangement provides the necessary strength at a low cost and reduces the weight compared to solid containers of equivalent strength. However, many problems are associated with the successful formation of core for a number of given applications. For example, it has been difficult to devise a core structure which will permit bending in any direction, or bending simultaneously in more than one direction without reducing the strength of the core or introducing undue stress in bending, or which is capable of withstanding stresses applied in almost any given direction of force, especially in shear. Accordingly, surfaces such as domes, spheres, and spheroidal structures along with flat and simple curved structures such as panels and cylinders would in many instances be desirable applications for core structure provided the core would not become excessively distorted, crippled or buckled and would easily conform to such surfaces. Also that the core structure, particularly in applications requiring bending in one or more directions, would have the necessary strength either in tension, compression or in shear, and for that matter would have maximum strength in almost any given direction of force notwithstanding its light weight and low cost manufacture.

Accordingly, it is a principal object of the present invention to make provision for a structural material which is conformable for use under a variety of different applications and which is characterized by its ability to be bent in one or more directions without sacrifice in strength or without introducing undue stresses into the material, while offering maximum strength under loading or forces applied in any given direction thereto.

It is another object to make provision for a core structure which is lightweight, rugged and which offers maximum strength in use in relation to the amount of material used in its formation.

It is a further object of the present invention to make provision for a core structure particularly adapted for use in the formation of sandwich panel structures wherein the core is interposed between a pair of flat surface materials, which is easy and economical to manufacture, adapted for mass production techniques and which is capable of being formed out of an unlimited number of low cost deformable materials while offering, due to the particular nature of its formation, unusually high strength and flexibility.

It is a further object of the present invention to provide for a unique method of forming the core structure of the present invention necessitating a minimum number of steps and greatly simplified apparatus which is easily adaptable for use in mass production and continuous forming techniques.

It is a still further object of the present invention to make provision for a process of manufacturing core material for application in flat or compound curved sandwich panels which is rapid and dependable, requires minimum contact with a flat deformable sheet member in forming the core; and moreover, a primary process which enable production of the core from a single flat sheet of any ductile material such as metal or plastic into a high-strength member through the use of conventional manufacturing processes, such as electroplating, casting, molding, and explosive forming.

The above and other objects, advantages and features of the present invention will become more readily understood from the following detailed description, taken together with the accompanying drawings, in which:

FIGURE 1 is a plan view of one form of core structure of the present invention.

FIGURE 2 is a vertical section view taken on line 2—2 of FIGURE 1, and illustrating an entire panel section.

FIGURE 4 is a plan view of another form of core structure of the present invention.

FIGURE 5 is a vertical section view taken on line 5—5 of FIGURE 4.

FIGURE 7 is a view of the apparatus employed in the process of this invention represented by a pair of opposing die members; and FIGURE 8 is a fragmentary, plan view with an outside portion of the top die member removed to illustrate the relative disposition between the parts comprising the apparatus.

Figure 3:
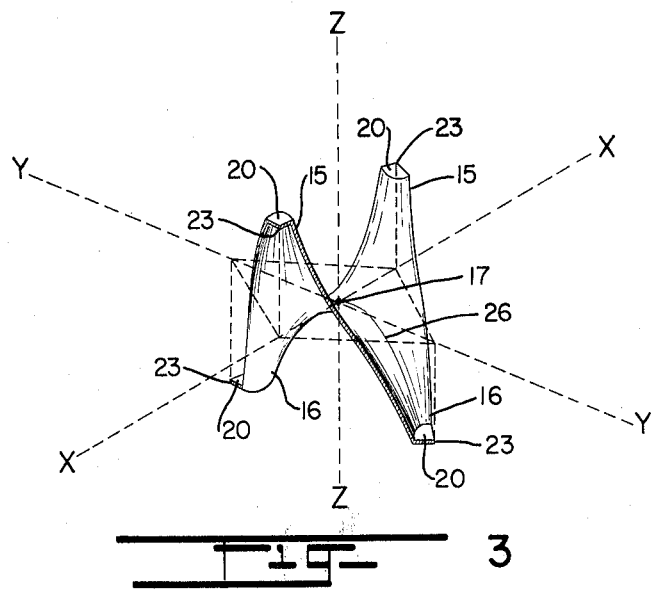
FIGURE 3 is a somewhat perspective view of a portion of the core shown in FIGURES 1 and 2 and specifically illustrating a module on which the core is based.

Referring more particularly to the drawings, there is shown by way of illustrative example in FIGURES 1–3 one form of core structure 10, in accordance with the present invention, wherein the core structure is shown interposed between a pair of flat sheet portions 11 and 12 to form a sandwich panel structure 14. As best illustrated by reference to FIGURES 2 and 3, the core structure is formed essentially out of some deformable material, either metal, plastic or the like so as to comprise a continuous series of upwardly and downwardly extending projections 15 and 16, respectively, formed out of the original surface 17 of the material, and each projection terminating in flat support surfaces 20, for example, to provide for application of other surfaces thereto such as the sheets 11 and 12 illustrated in FIGURE 2.

Basically, the core structure is formed to the end of providing an economical, efficient way of making a lightweight member of maximum strength and overall flexibility for use as a support structure, and where the core is capable of being bent in one or more directions without introducing undue stresses or distortion into the product. For this purpose, the formation of the entire sheet or core structure of FIGURES 1 and 2 is derived from, or based on, the configuration of the module illustrated in FIGURE 3. Broadly, this module is formed from an even-sided polygonal area of an original flat sheet of material from which the core structure is made, this area being designated at 22 in FIGURE 1. It will be noted that the polygonal area, a square in this instance, has four corners 23 at equal diagonal distances from a common center 17, and in the formation of the module each corner in succession around the perimeter of the square is moved alternately up and down away from the plane 22 of the sheet.

In the particular module illustrated in FIGURE 3, the polygonal area is that of a four-side polygon having four corners radiating from a common center and by deformation away from the plane of the sheet is deformed into a generally saddle-shaped configuration. In this relation, two of the diagonally-opposed corners curve downwardly away from the original plane of the sheet and the other two corners similarly curve upwardly from the original plane of the sheet so as to form alternately high and low nodular end points at the diagonals through the corner of the module. Moreover, at the intersection of the corners, or at the center 17, it will be seen that the module remains in the original plane of the sheet; actually, a limited surrounding surface area at the center remains in the original plane of the sheet. Geometrically, this saddle-shaped structure is generally referred to as a hyperbolic paraboloid where sections parallel to (and above) the X–Y coordinates (horizontal plane of the sheet) are hyperbolas symmetrical with the X axis, and sections parallel to and below the X–Y plane are hyperbolas symmetrical with the Y axis. Sections parallel to the other two coordinate planes are parabolas wherein those parallel to the X–Z plane open upward, while those parallel to the Y–Z plane open downward. Thus, a horizontal section taken through the nodular projections or depressions takes the general form of a hyperbola and a vertical section taken therethrough will be in the general shape of a parabola; here, it will be recognized that termination of the projections in rounded flat surfaces 20 will cause some variance from the cross-sectional forms as described as the surfaces 20 are approached. Additionally, diagonal axes 26 of the diagonally-opposed curving nodular areas define parabolas or in other words, there curvature is such that the locus of a point moving therealong has its undirected distances from a fixed point and a fixed line equal, again with some slight variation in approaching the flat surface areas 20.

In the actual formation of the continuous core structure, it will be seen from FIGURES 1 and 2 to be comprised of a continuous series of the saddle-shaped modules, and therefore consists of a series of polygonal areas, each area having its corners curving alternately upwardly and downwardly away from the original plane of the sheet at the central portion thereof. Moreover, the intermediate corners of each polygonal area are common to each of four different polygonal areas and radiate equally away from the center of each area, either above or below the plane. Also, the amplitude of the nodular points, or corners, is such that the corners terminate equal distances above and below the original plane of the sheet and are preferably shaped to define the spaced, flat supporting surfaces 20 of generally circular configuration.

This above-described core is thus based on a configuration which has been found to provide an unusually rugged, high strength structure, capable not only of withstanding high compressional and tensional forces, but also capable of withstanding high shear forces. The latter quality is normally lacking in known core structures due to the absence of material in the horizontal plane at the intermediate portion of the corrugated sheet. On the other hand, one disadvantage in adopting a four-side polygonal area as the basis for formation of the core structure is that it will not easily conform to compound curved structures, such as, the spheroidal-shaped surfaces. The reason for this is that if one were to move the two diagonally-opposed lower nodular points of each module toward one another, the two higher points would similarly tend to move toward one another. Thus, in multiple, a sheet based on this module would if bent on any line across the original plane of the basic sheet either develop a cylindrical bend, or bend in an opposite curve, along a line normal to the line chosen first, or in any event weaken and distort the core structure. Nevertheless, the four-sided module is ideally suited for flat supoprting structures, or for cylindrical sandwich or support structures, and additionally for saddle-shaped sandwich panels, although the latter is not customarily employed in structural or engineetring operations.

Figure 6:
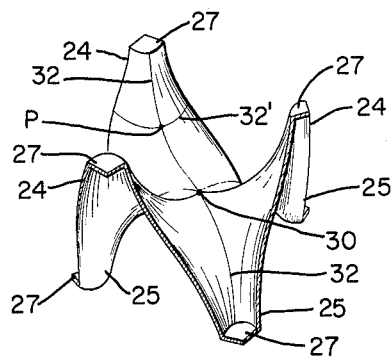
FIGURE 6 is a perspective view of a portion of the core shown in FIGURES 4 and 5 and showing a module of the modified structure.

In the form shown in FIGURES 4–6, there has been devised a core structure configuration again based on the use of an even-sided polygonal area which not only provides the desired strength and flexibility characteristics illustrated in FIGURES 1–3, but more important, is ideally suited for bending in one or more directions without introduction of stresses or weakening the structure in any way.

Again, in the form shown in FIGURES 4–6, the core structure is defined by a deformable sheet material having a continuous series of upwardly extending and downwardly extending projections 24 and 25 forming at their termination points flat support surfaces 27 for application of flat sheets 28 and 29 in forming a finished panel structure. In this form, however, and as best seen from FIGURE 6, the module from which the core structure is derived is based on a six-sided or hexagonal polygonal area of the original sheet and where alternate corners or projections 24 and 25 of the polygonal area in succession curve upwardly and downwardly away from the original plane. Again, the alternate corners of the module radiate away from a common center or mid-level 30 of the polygon which remains at the original plane of the core structure so as to provide the desired strength in the core to resist shear and compression. Also in curving away from the central area of the module each projection again forms in relation to the center of the polygonal area a hyperbolic curve in a horizontal section and a parabolic curve in a vertical section taken through the area, and each corner in succession terminates equally above and below the original plane of the sheet so as to define the supporting surfaces for application of the flat sheets 28 and 29.

The geometric configuration of this module may be generally defined as a "monkey saddle" or a trigonal hyperbolic paraboloid in which there exists symmetry about three diagonal axes passing through diagonally opposed high and low nodular points. In this connection, it will be noted that diagonally opposite corners 24 and 25 are high and low, whereas in the four-sided polygon diagonally opopsite corners are either in the high or low plane. Actually, here the curve, designated along line 32 in FIGURE 6, of any axis passing diagonally from one point to the opposite low point is a cubic parabola, there being three cubic parabolic curves passing through the mid-level or center of the module.

In the formation of a continuous core based on the configuration of the hexagonal module, FIGURES 4–6, again each polygonal area will have a center and six corners at equal distances from the center, and each corner being common to three or more adjacent polygonal areas. In this relationship, it has been found that the resultant core structure is capable of being bent or curved into a number of desired shapes and along any horizontal axis passing therethrough without disturbing the directional strength qualities of the core or distorting the relative disposition between the modules.

From the above, the outstanding characteristic of the core is that for a given amount of material the resultant core will provide maximum strength in every possible direction of force since the material is aligned in formation through infinitely variable degrees of curvature; and, through the use of even-sided polygonal areas, this variation is uniform throughout. By regulating the dimensions of the polygonal area together with the distance between corners the primary strength of the core structure also may be aligned in particular directions depending upon the direction of force applied thereto. For example, the four-sided form may undergo substantial distortion so that the corners are irregular distances from the center and for instance may assume the shape of a trapezoid, diamond, parallelogram or rhombus; and, the six-sided form may be elongated in a particular direction or otherwise distorted. Nevertheless, the core will retain reasonable strength in all directions with the desired maximum strength aligned in a selective direction or directions.

Thus, a number of conclusions can be drawn from the unique design and construction of the core structure, especially in relation to the fundamental properties of the six-sided module as shown and described. For instance, where the mid-point or center lies, is the lever where other core materials generally tend to fail in shear and compression due to the lack of any material aligned in a horizontal direction in this plane. In addition, the elastic core material of this invention will stretch and conform to essentially all compound surfaces with a low order of flexural stress at the mid-point, the latter being the focus of the areas of the module shape either bent or flexed. Furthermore, as simple corrugated material can be stretched at right angles to the direction of corrugation, as in an accordion and only flexural stresses develop, the same is true of the core material of the present invention with the added distinction that the latter may be stretched in all directions to some degree and in three primary directions which provide sufficient components for practically omni-directional stretching. As an alternative, if the surface area is removed surrounding each midpoint or center of each module in a sheet of core material as shown, it will be observed that the resultant core will become very elastic in all directions but weaker, under compression loading of the module, in the direction of the vertical axis. Nevertheless, this will have practical application where compression loading is not critical. An added feature of the present invention is that the lateral stretchability of the core is based on the fact that a line parallel to the skin forces within the apparent thickness of the core cannot find any continuous path in the core material except when it is at the level of the original plane at the centers and passes through two adjacent center areas. As previously stated, this one level of continuity may be made discontinuous by perforating and removing the mid-points and areas surrounding same.

Accordingly, in both forms of the core structure described, it will be seen that any point in the core, other than the flat support surfaces, is characteristically on a double curved surface, this double curvature being generally hyperbolic-parabolic in nature, and secures a number of notable advantages in the formation of core structure. In other words, by adoption of a double curvature based on the hyperbolic-parabolic form, an observer citing along a line normal to the surface through virtually any point, such as the point P in FIGURE 6, will find curvature is both away from him along the line 32 and toward him as along an imaginary line 32'. Assuming that a convex curvature is defined as a positive curvature and concave curvature as a negative curvature, than actually the curved surface formed is a product of a positive and negative curvature and, specifically, of a hyperbolic-parabolic nature. Through this specific form of curved surface, the resultant core structure is given unusual stability and also the outstanding ability to resist compression between adjacent flat supporting surfaces, such as the surfaces 20, without buckling especially after formation of the entire panel including the flat surfaces 11 and 12. At the same time, prior to formation of the final panel, the double curvature of the core provides a great deal of lateral flexibility which permits bending in substantially any desired direction with comparatively little distortion. Stated another way, it is possible for any of the support points to undergo lateral displacement without altering the basic nature or integrity of the module so distorted and again, the double curvature permits this easy displacement and change in curvature. Actually, this bending is similar to stretching the folds of a pleated material with the important exception that in the present invention the compression or elongation of the module may be accomplished to a useful degree in any desired direction or in more than one lateral direction simultaneously. Again the double curved surface of the module, it has been found, may be imparted under the free forming action of male members, to be described, wherein the properties of the material itself will determine the actual condition of curvature without contact by pins or the like during formation. Thus, the stretching action which results in the double curvature is a shape naturally assumed and is therefore basically economical while lending desirable qualities of stability and lateral flexibility.

There is shown in FIGURES 7 and 8, for the purpose of illustration, a preferred form of die assembly 40 for use in the formation of the core structure shown in FIGURES 4–6. Once the inherent capabilities of the core structure described are recognized, there is nevertheless involved, particularly in continuous forming processes, the problem of developing a successful way of rapidly and economically forming the core in a reliable manner. In accordance with the present invention, this process is carried out in a greatly simplified way by devising a method in which alternate corners of the even-sided polygonal modules may be drawn or forced in opposite directions away from the original plane of the sheet material and in such a way as to take advantage of the natural behavior of the material composition to form the generally saddle-shaped configuration of the modules. This is accomplished by applying concentrated forces at the corners of the polygonal areas, and again where the forces applied to adjacent corners are in opposite directions while leaving the intermediate portion of each module undisturbed so as to remain in the original plane of the sheet.

To carry out the process of the present invention, opposing die members 42 and 43 are illustrated in FIGURES 7 and 8, each basically being defined by an outer flat support member or holder 44 having a lattice arrangement of embossing pins 46. Together, the opposing die members are shown disposed in facing, opposed relation, and where the embossing pins 46 generally constitute oppositely-directed male members of corresponding size and depth which are capable of applying force in opposite directions to alternate corners of each even-sided module.

Specifically, in forming the hexagonal core structure, the material for the core may first be heat-softened and placed between the opposing die members, the latter being normally positioned in spaced-apart relation. Then, as shown in FIGURE 7, the die members are brought together so that the male members contact spaced portions of the sheet corresponding to the corners 24 and 25 of the polygonal area; forming of the areas of the sheet not in contact with the die male members is determined by the natural behavior of the material as the corners are forced away from the original plane in opposite directions. In this connection, it has been found that substantially all ductile materials, such as the metals or plastics, have this characteristic and in response to the action of the die members will become transformed into saddle-shaped portions as described. The die members may be pressed together by various suitable means such as by positioning in a press, and the pins or male members may be mounted in evenly-spaced openings in the respective holders 44 of the die members so that the projecting ends of the pins of one die member will enter between the pins of the other member in an offset, but uniform, pattern. The length that each pin projects out of the holder will be the maximum depth of embossing that may be accomplished with a particular holder and pin member and actually the two die members will appear identical in order and spacing of the pins since each will be representative of alternate corners of the continuous series of modules to be formed out of the flat sheet material as illustrated in FIGURES 4–6.

In this connection, and referring specifically to FIGURE 8, it will be noted that the male members or pins 46 on each die form a continuous series of triangular patterns, one such pattern being indicated by the dotted line 46a. Additionally, when the opposing die surfaces are brought together and aligned in predetermined relation, it will be seen that the alignment is such that the opposing male members will together form a continuous series of hexagonal patterns 46b. Based on this spacing of the pins, each module is formed so that proceeding around the perimeter of each hexagonal module, it will be noted that the corners project alternately above and below the original plane of the sheet, the plane remaining undisturbed at the mid-level or central portion of each module.

In the formation of a core structure according to that illustrated in FIGURES 1–3, the same principle may be applied in constructing the die members such that diagonal series of pins will be formed on one die member to correspond with the desired spacing and formation of the corners 15, and on the opposite die surface a diagonal series of pins will be positioned to correspond with the desired configuration and spacing of the corners 16. Then, upon pressing the opposing die members together with the opposing pins evenly spaced, the sheet material will be formed into the configuration illustrated in FIGURES 1–3.

When the two die members are mounted on opposing platen surfaces of a press or the like to perform the process of stretching or forming the core material from a flat sheet of ductile material they will, of course, be mounted in facing relation and so positioned that the pins of one assembly will register between the pins of the opposite assembly and the identical pattern of each lattice of pins will be embossed in the original flat sheet of ductile material. Prior to forming, the ductile material may be made easily deformable under the influence of heat; for example, a thermoplastic material such as polystyrene is easily deformed when brought to elevated temperatures on the order of 200°–250° Fahrenheit. Then upon interposition between the die members into registry with one another, the resultant core structure will be formed. Upon cooling, and in forming flat panels, the core structure will have the necessary rigidity particularly upon application of the outer protective sheets 28 and 29 to the support surfaces 27 on the opposite sides of the core so as to effectively resist forces and strains applied thereto. Here any suitable bonding material may be applied for adherence of the sheets 28 and 29 to surfaces 27. Due to the configuration of the core, it will also retain its overall flexibility for conformation to various curved or compound curved surfaces. Here, the sheets 28 and 29 would be preformed to the desired curvature, along with the core, and then applied together.

In its simplest form, the die assembly may include holders composed of flat plates of steel, wood or any other suitable material, or it is within the scope of this invention that the holders or supporting members may be in the shape of a cylinder, such as for example the external members of a pair of drums or rolls through which the flat sheet or matrix is drawn for the embossing operation. As an alternative, the holder may further be constituted of a series of flexible bars or plates mounted on oppositely-rotating endless belts or conveyors positioned in adjacent but spaced relation to one another such that the pins will be continuously brought into intermeshing, evenly-spaced relation as the core is drawn between adjacent surfaces of the conveyor. Thus, either separate or continuous sheets of core material may be formed utilizing the disposition and arrangement between the pin members as described, and depending upon the desired application of the core.

An added utilization of the forming process of the present invention as described is in forming die surfaces corresponding to the desired configuration of the core material by first running a matrix of some deformable material through the die as described, then the resultant form may be used as a pattern for duplicating the contour of a mold, punch, or die. This would be a particular value in the manufacture of core material from more rigid materials such as ceramics, thermoset plastics or sheet materials of a very high modulus of elasticity. In using die surfaces preformed to be of the desired conformation of the core material, it will be evident that various modern techniques such as casting, plating, molding and explosive forming may be employed. In this connection, it may be desirable in this process to use the previously embossed core material as a pattern for casting of a high strength plaster on both sides of the embossed sheet of core material, then employing the plaster reproductions as patterns for duplicating either side of the core in cast or machine heat-treated steel. Such a technique is common practice in modern tool and die shops.

Depending upon the deformability of the material, either spaced opposing male members may be utilized in forming the core or, as an alternative, a pattern may first be made with the die assembly for subsequent use in forming the actual core structure as described. In either form of the process of the present invention, each stems from the use of opposed patterns which will apply force at spaced points on the matrix corresponding to the corners of the modules and wherein the force is applied to alternate corners in opposite directons to form a continuous series of saddle-shaped portions derived from even-sided polygonal areas of the matrix. It is evident in this process that most desirably the matrix be of uniform thickness and composition, and also easily deformable so that utilization may be made of its natural behavior in arriving at the final shape. At the same time, the foregoing is believed to represent a greatly simplified manner of forming a comparatively complex pattern embodying an almost infinite variation of curvatures so as to be of maximum strength in almost any given direction of force.

Based on the foregoing, the desirable aspect of incorporating the specially-formed, double curvature into the core structure may be arrived at in a number of ways, such as through the means and method described. Also, such method may be modified for any desired or permissible modification in the core structure, such as, for example, to incorporate directional strength and flexural qualities into the core.

As hereinbefore stated, the core structure of the present invention has a number of highly desirable applications and, for example, may be employed either in flat panel structures or in the formation of a number of curved structures either simple or compound due to its directional stability and lateral flexibility. At the same time, the core structure has a number of other practical applications, for example, as a fluid transfer medium. Thus, two gases or fluids may be conducted through the panel structure illustrated in FIGURE 2 and may be separated from each other by conduction along opposite sides of the core structure. The particular advantage of the core structure of the present invention is that the separated gases or fluids will flow along random paths between inlet and outlet points so as to create a high degree of turbulence. Of course, in this application, the function of the core is not so much a supporting structure as a separator in a heat exchanger or a bafflle, or a desirably complex and large area created in a small cubage or space for the purpose of turbulence; the latter desirable in promoting reactions in a chemical process.

The core structure itself apart from its application in a panel structure, as illustrated in FIGURE 2, may serve as a supporting structure for a number of purposes such as for pallets, and in such applications it will be noted that a plurality of core structures may be stacked together in nested relation so as to occupy a minimum of space. On the other hand, either a pair or plurality of cores may be stacked such that the support surfaces of adjacent cores abut one another to provide an overall structure of the desired thickness and strength. Also, it may be desirable to form the core such that the upward and downward projections are projected varying distances from the plane of the sheet, for example, to conform to face sheets which are not equidistant as in airfoil or wing sections in aircraft. Furthermore, it is entirely possible to form the core structure of resilient materials or to use the core structure in association with other resilient materials for various end uses. In any event, in view of the unique characteristics and configuration of the core structure of the present invention, it is contemplated that the core, with slight modification, would have any number of end uses entirely within the scope of the present invention.

It is therefore to be understood that various modifications and changes may be made in the article of manufacture, method and apparatus employed in accordance with the present invention without departing from the scope thereof as defined by the appended claims.

What is claimed is:

1. A structural element comprising a sheet member comprised of a joined series of substantially saddle-shaped areas, said areas each including a mid-level portion and alternate upwardly and downwardly curved projections radiating from a common center located at each mid-level portion.

2. A structural element according to claim 1 including an opening in each of said mid-level areas 3. A structural element according to claim 1 in which said saddle-shaped areas are each in the substantial form of a hyperbolic paraboloid.

4. A structural element according to claim 1 in which each of said saddle-shaped areas is in the substantial form of a trigonal hyperbolic paraboloid.

5. A structural element according to claim 1 in which each area is four-sided.

6. A structural element according to claim 1 in which each area is six-sided.

7. The structural element of claim 1 in which said curved projections terminate in flat surfaces.

8. The structural element of claim 1 including covering means on opposite sides of said structural element secured to said curved projections.

9. A structural element comprising a sheet member formed of a joined series of even-sided polygonal areas each having curved projections equal to the number of said sides spaced radially around a common center on each of said areas located on a center plane, said projections radiating from said common center to end at respective corners of said polygonal areas to form nodular end points, one series of alternate projections extending upwardly from said plane and the other series of alternate projections extending downwardly from said plane.

References Cited by the Examiner
UNITED STATES PATENTS

| | | | |
|---|---|---|---|
| 105,661 | 7/1870 | Edwards | 154—55 |
| 728,829 | 5/1903 | Arkell | 154—30 |
| 2,856,323 | 10/1958 | Gordon | 154—45 XR |
| 2,858,247 | 10/1958 | De Swart | 154—45.9 |

ALEXANDER WYMAN, *Primary Examiner.*

CARL F. KRAFFT, EARL M. BERGERT, *Examiners.*